(12) United States Patent
Kobayashi

(10) Patent No.: US 6,468,455 B1
(45) Date of Patent: Oct. 22, 2002

(54) MANUFACTURING METHOD OF SEALING DEVICE

(75) Inventor: Nobuyuki Kobayashi, Fukushima (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/357,283

(22) Filed: Jul. 20, 1999

(30) Foreign Application Priority Data

Jul. 24, 1998 (JP) .............................................. 10-208834

(51) Int. Cl.⁷ .......................... B29C 37/02; B29C 45/14
(52) U.S. Cl. ........................ 264/161; 264/163; 264/275; 29/418
(58) Field of Search ................................ 264/267, 268, 264/271.1, 275, 161, 138, 274, 154, 163, 266, 273; 29/418, 423

(56) References Cited

U.S. PATENT DOCUMENTS

| | | | | |
|---|---|---|---|---|
| 4,155,153 A | * | 5/1979 | Bainard et al. ............. | 264/268 |
| 4,304,744 A | * | 12/1981 | Stroud ........................ | 425/809 |
| RE33,192 E | * | 4/1990 | Bainard et al. ............. | 264/266 |
| 5,071,611 A | * | 12/1991 | Yagi et al. .................. | 264/154 |
| 5,082,612 A | * | 1/1992 | Butler et al. ................ | 264/163 |
| 5,368,797 A | * | 11/1994 | Quentin et al. ............. | 264/152 |
| 5,595,697 A | * | 1/1997 | Wada et al. ................ | 264/138 |
| 5,884,919 A | * | 3/1999 | Saito .......................... | 277/562 |

FOREIGN PATENT DOCUMENTS

JP          60-201117          10/1985

* cited by examiner

Primary Examiner—Angela Ortiz
(74) Attorney, Agent, or Firm—Jacobson Holman, PLLC

(57) ABSTRACT

A process for producing a sealing device includes forming the metal component having a positioning portion for positioning the metal component onto a vulcanizing mould. The metal component also has a cutting portion in a specific portion of the metal component. Removing the positioning portion from the obtained sealing device can be carried out easily because of the presence of the cutting portion.

8 Claims, 12 Drawing Sheets

Figure 15         Prior Art
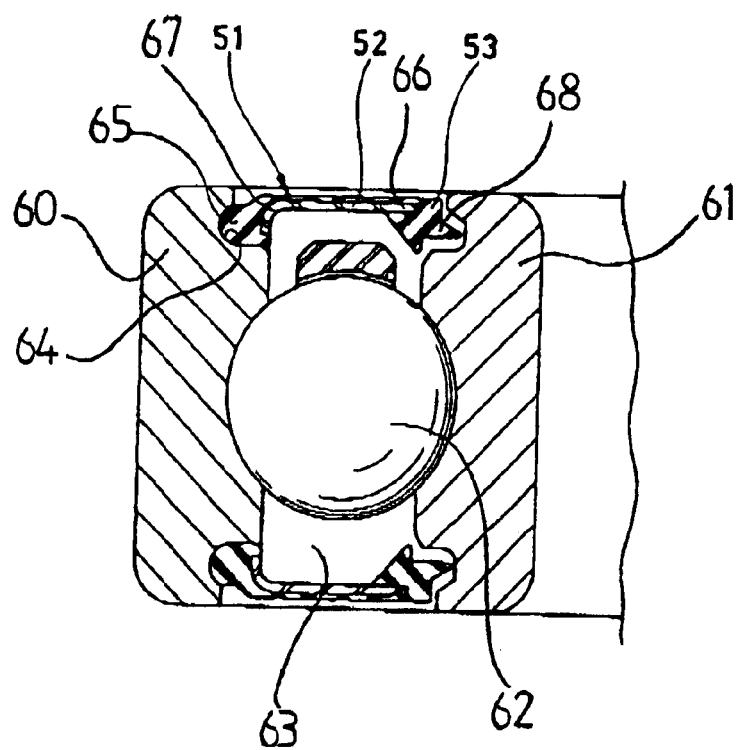

MANUFACTURING METHOD OF SEALING DEVICE

BACKGROUND OF THE INVENTION

1. Field of the Invention

The present invention relates to a manufacturing method of the sealing device, and more particularly to a manufacturing method of the sealing device having a metal fitting and an elastic elastomer bake-molded to the metal fitting. The present invention also relates to a sealing device having a metal fitting and an elastic elastomer bake-molded to the metal fitting.

2. Description of the Related Art

FIG. 15 is a partial cross-sectional view of a conventional sealed bearing. As shown in FIG. 15 of a conventional sealing device 51, the sealing device 51 has a metal fitting portion 52 and an elastic elastomer portion 53. The metal fitting portion 52 is like a ring in shape. The metal fitting portion radially outwardly extends from an inner periphery 66 to a curved portion 67, then curves downwardly with curvature. The elastic elastomer portion 53 is also like a ring in shape. The elastomer portion 53 covers the metal fitting portion as shown in FIG. 15. At an outer periphery of the elastomer portion 53 there is a bulge portion 65 which fit into a groove 64 of an outer race 60. At an inner periphery of the elastomer portion 68 there is also a bulge portion having a sealing lip 68, which slidingly contacts with a groove of an inner race 61. Between the outer race 60 and the inner race 61, a bearing (ball bearing or roller bearing) 62 is held. In a space 63 other than bearing, there is a lubricant. The lubricant is sealed by the sealing device 51.

As shown in FIG. 15, in a sealing device 51 or the like for use such as a hard disc drive (HDD) sealing device installed in a small space. the seal 51 is narrow in width. And a metal fitting 52 of the sealing device 51 is also designed as extremely thin as 0.1–0.2 mm in plate thickness as shown in FIG. 15. Accordingly, in case the seal 51 of this type is manufactured by a conventional method, the metal fitting 52 is often displaced from its guide portion 57 (as shown in FIG. 14) due to a fluid pressure of a material for molding an elastic elastomer 53 and a heat expansion of the metal fitting 52. thereby sometimes being deformed or sometimes causes damage to the upper and lower vulcanizing mould 54, 55. These drawbacks are derived from shortness in length in the guide portion 57 of the metal fitting 52. Because the thickness of the seal is limited, so the height of the guide portion 57 becomes small.

Still more, it is not easy to set up the metal fitting 52 onto the vulcanizing mould 54 by using a robot arm (not illustrated in the drawing) when mounting this metal fitting 52 on the lower vulcanizing mould 54.

SUMMARY OF THE INVENTION

An object of the present invention is to provide a manufacturing method of the sealing device in which a metal fitting can be positioned exactly and firmly in a vulcanizing mould and the metal fitting can be easily carried onto the vulcanizing mould.

An object of the present invention is achieved by the sealing device comprising: a ring shaped metal fitting portion having an inner plain ring portion, a skirt-like portion extending obliquely or radially outwardly from an outer annular periphery of the inner plain ring portion, and an outer ring-like portion extending radially outwardly from the outer periphery of the skirt-like portion; a ring-shaped elastic elastomer mounting on all over the upper surface of the ring-shaped metal fitting portion and further extending radially outwardly, the elastomer having an upper surface being substantially plain and a curving portion curving downwardly at an outer periphery of the elastomer. The thickness of the elastomer in the axis direction at the peripheral outer portion is thinner than that of the adjacent inner portion.

The object of the present invention can be achieved by a manufacturing method of a sealing device which, in a manufacturing method of a sealing device having a metal fitting and an elastic elastomer that is bake-molded to the metal fitting, comprises the steps of:

forming a metal component having a positioning portion for positioning thereof at a predetermined position in a mould, and a metal fitting portion to be used as the metal fitting in the sealing device; positioning the metal component at the predetermined position in the mould; molding an elastic elastomer in the mould to obtain a bake-molded elastic elastomer having the metal fitting portion monolithically; and removing said positioning portion from the metal fitting portion, to obtain the sealing device.

Moreover the manufacturing method of a sealing device of the present invention in which when providing a metal component in which a positioning portion and a metal fitting portion are provided monolithically, the metal component has a half-cutting portion or a step portion for making separation of the positioning portion from the sealing device.

Still more, according to the manufacturing method of a sealing device, the positioning portion has a cross-sectional L-shaped portion connecting annularly or partially to the metal fitting portion.

The L-shaped portion has a cylindrical portion which guides each metal component slidingly on the surface of the mould into the predetermined place of the mould. The L-shaped portion has also a flange portion being connected to the inner or outer periphery of the metal fitting portion. The flange portion is, in later process. preferably used as a portion to be pushed by such as a punching jig, to separate the positioning portion from the metal fitting portion.

In the manufacturing method of a sealing device of the present invention having above-mentioned processes, a positioning portion and a metal fitting portion are formed monolithically when forming a metal component, and this metal component is positioned onto a vulcanizing mould exactly by means of the positioning portion. The metal fitting portion is used as a part of a metal plate of the sealing device. The positioning portion in a later process is to be separated and removed from the metal fitting portion (part), therefore, it is possible to mold its shape to match a purpose as to position the metal fitting portion exactly and firmly in the vulcanizing mould. Accordingly, by mounting the metal fitting on the vulcanizing mould by means of the positioning portion with a shape and a function as above mentioned, it is possible to prevent the metal fitting from displacement from a guide portion of the vulcanizing mould due to a flow pressure of a material to be molded or a heat expansion of the metal component or the like. In addition, since the metal component is provided as a large-sized portion having monolithically the positioning part (portion) and the product part (portion), it is easily possible to carry this metal component by a robot arm or the like onto the vulcanizing mould.

When providing a metal component having a positioning portion and a metal fitting portion are made monolithically.

it is desirable that a half cutting portion, a step portion or the like in a specific portion of the metal component is formed at the same time. The thus obtained metal component can be separated exactly and easily at the half cutting portion or the like, in a process of removing the positioning portion from the metal fitting portion.

The object can be achieved by another method. The process comprises: forming a metal sheet having a plurality of metal fitting and a supporting portion supporting the plurality of metal fitting therein, a central hole in each metal fitting and a wedge-cut (or step or half-cut) annular portion at an outer periphery of each metal fitting; positioning the metal sheet on a large size lower mould having a plurality of mould therein; placing a large size upper would corresponding to the large size lower mould; molding an elastic elastomer into each mould to obtain a bake-molded elastic elastomer having the metal fitting; discharging from the large size mould the bake-molded elastic elastomer having the metal fitting connected to the supporting portion by way of a thinned burr made of bake-molded elastic elastomer; and removing the products by cutting the burr. At the half-cut portion the metal fitting is separated exactly and easily from the supporting portion when the large size moulds is closed or when the elastic elastomer is injected into each mould, so that the outer periphery of the metal fitting can be completely covered by elastic elastomer.

BRIEF DESCRIPTIONS OF THE DRAWINGS

Figure 3:
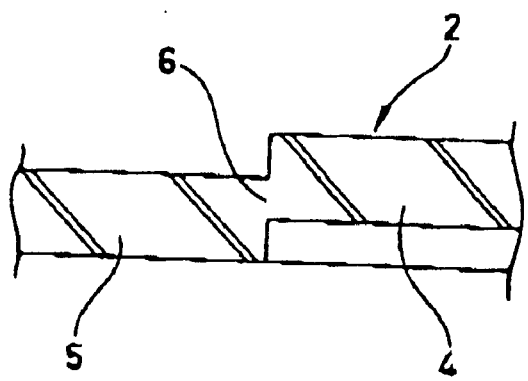
Figure 3:
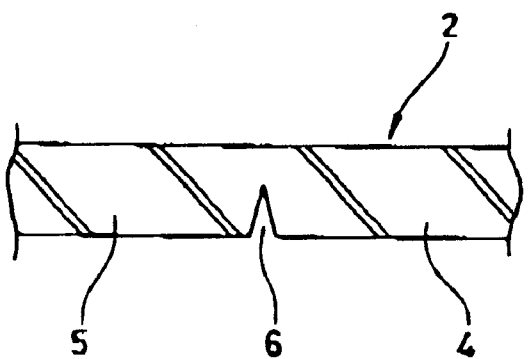
Figure 4:
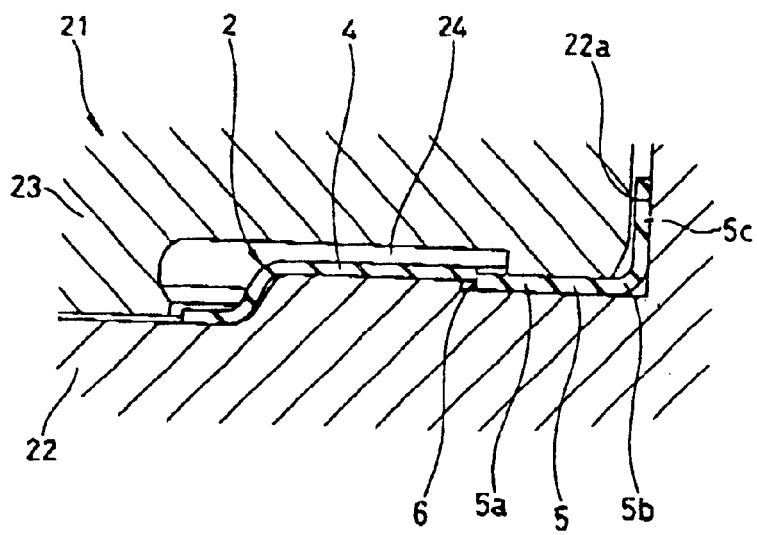
Figure 5:
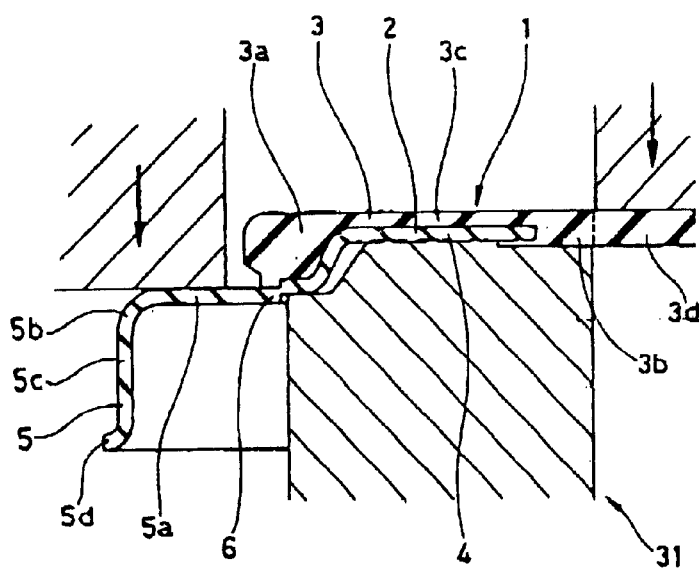
Figure 6:
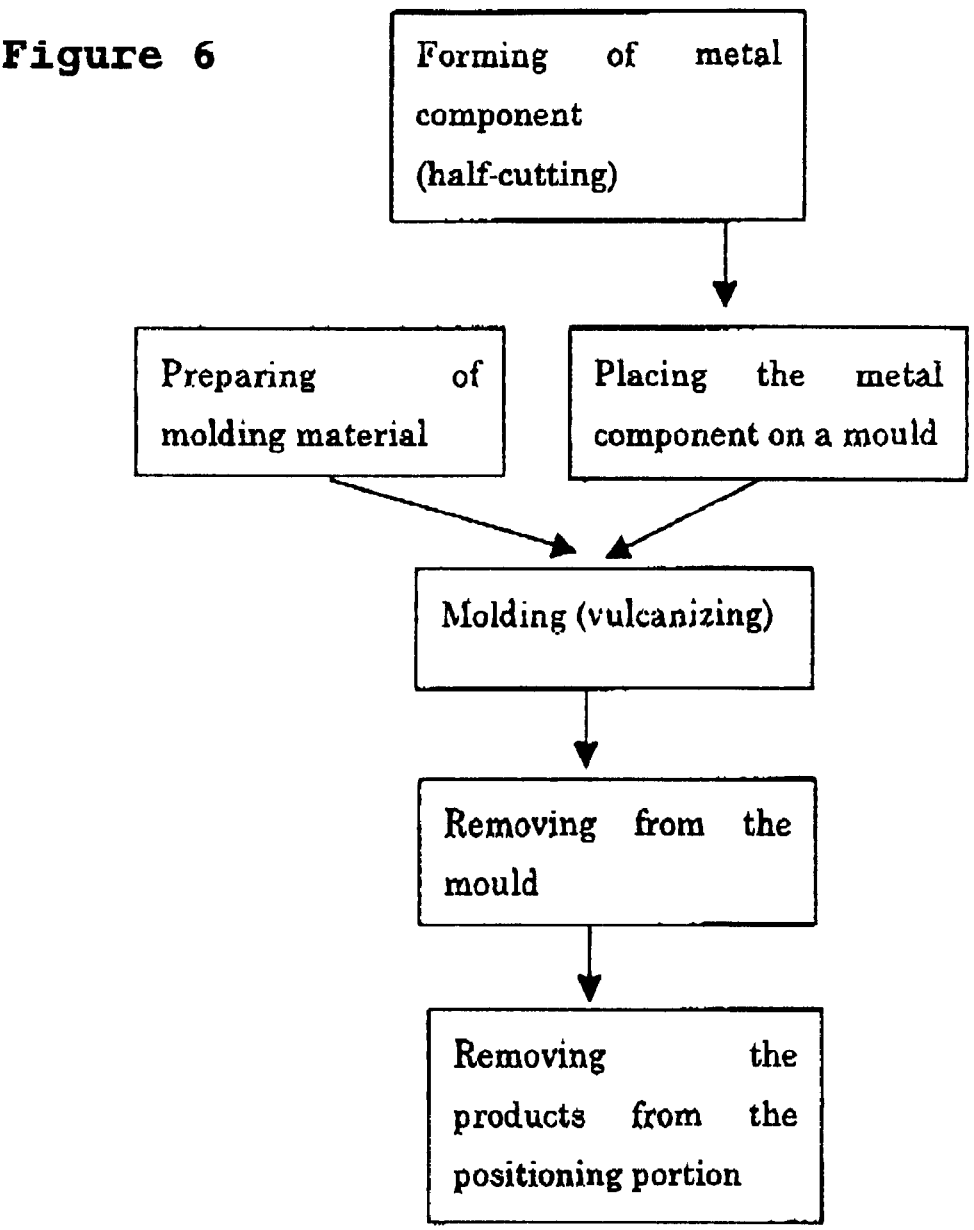
Figure 7:
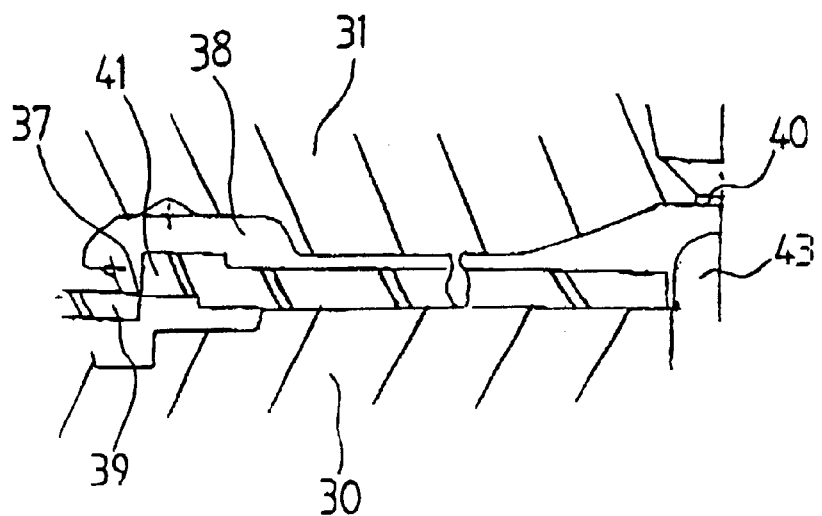
Figure 8:
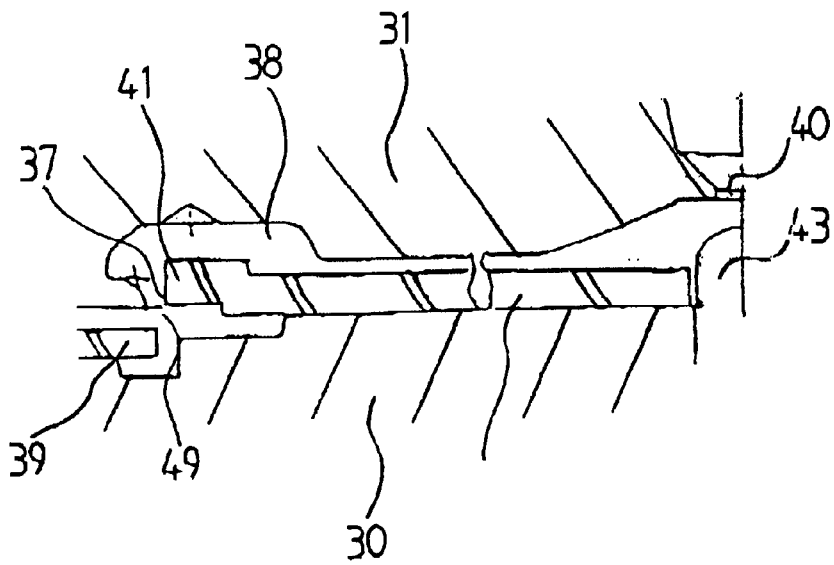
Figure 9:
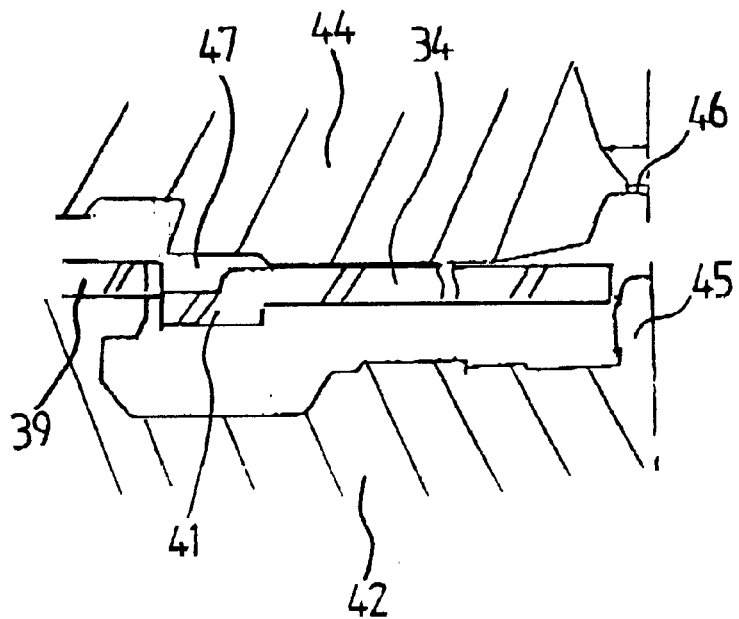
Figure 10:
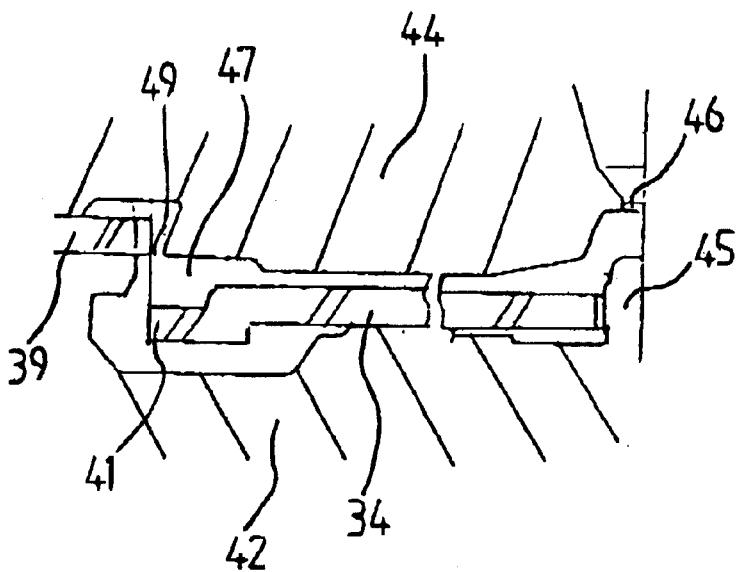
Figure 11:
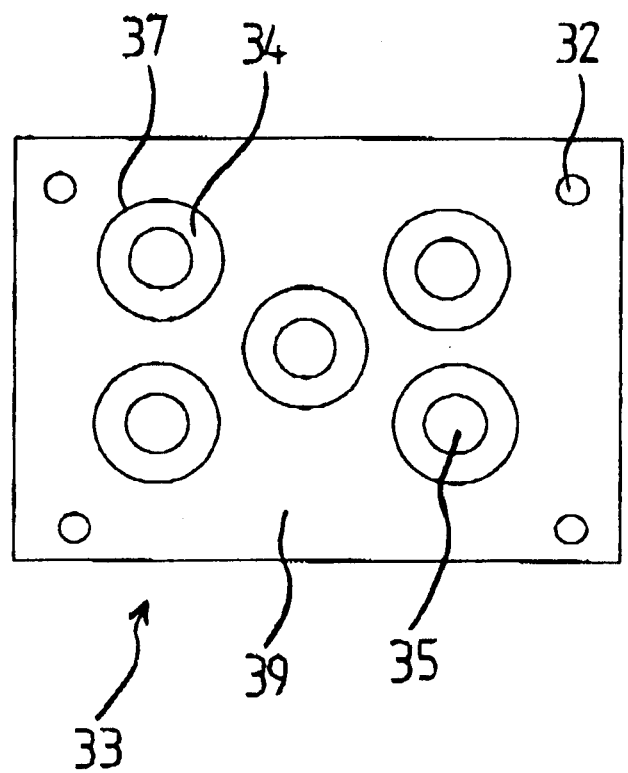
Figure 12:
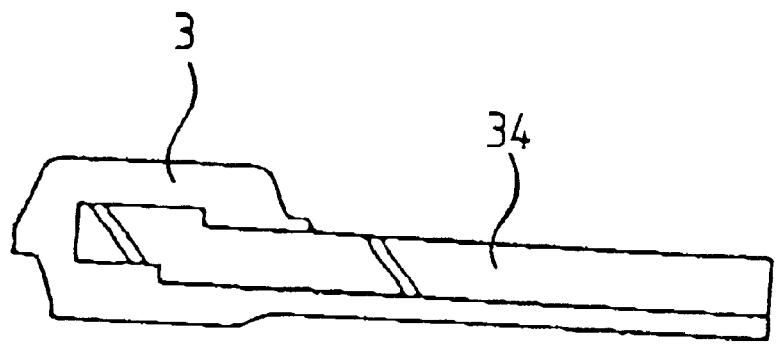
Figure 13:
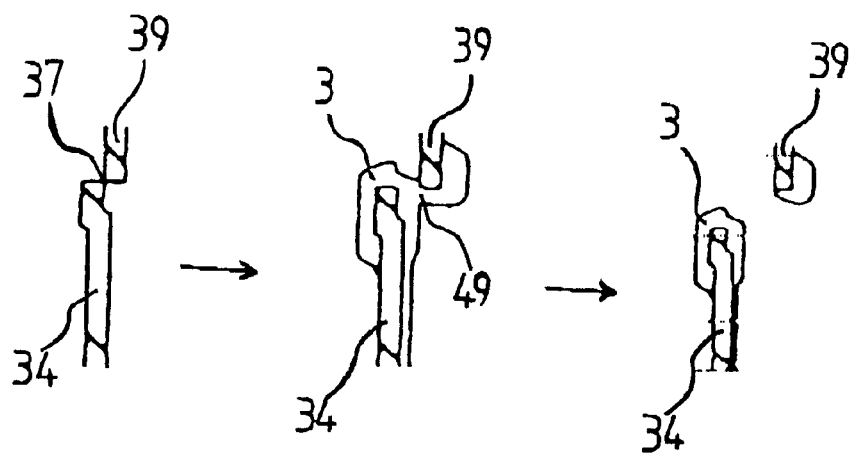
Figure 14:
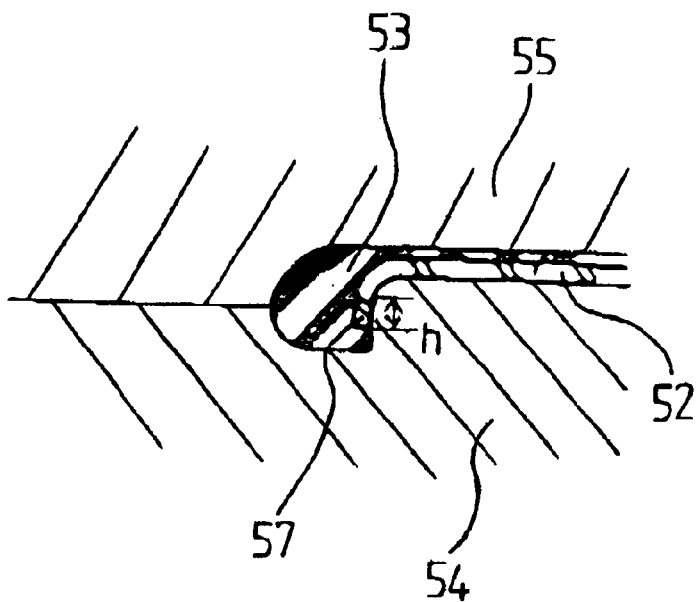

FIGS. 3(A) and (B) are enlarged sectional drawings of the specific parts (half cutting portion and step portion) of the separation portion of the present invention;

FIG. 4 is an explanatory drawing relating to another embodiment of the manufacturing method of the second embodiment of the present invention;

FIG. 5 is an explanatory drawing of the separating process of the present invention;

FIG. 6 is a flow diagram of the manufacturing process of the present invention;

FIG. 7 is an explanatory drawing relating to the process of the manufacturing method of the third embodiment of the present invention;

FIG. 8 is an explanatory drawing showing the state after elastomer is injected;

FIG. 9 is an explanatory drawing relating to the process of the manufacturing method of the forth embodiment of the present invention;

FIG. 10 is an explanatory drawing showing the state after upper die pushed the metal fitting;

FIG. 11 is a plan view of an schematic drawing showing the metal sheet having a plurality of the metal fitting;

FIG. 12 is a partial cross-sectional side view of another type of bearing seal of the present invention;

FIG. 13 is a schematic diagram relating to the process of the manufacturing method of the third and forth embodiment of the present invention;

FIG. 14 is an explanatory drawing relating to the process of conventional manufacturing method; and FIG. 15 is a partial cross-sectional view of the conventional bearing seal installed in a bearing.

DESCRIPTION OF THE PREFERRED EMBODIMENTS

Next, the embodiments according to the present invention are described referring to drawings.

EMBODIMENT OF THE BEARING SEAL

Figure 1:
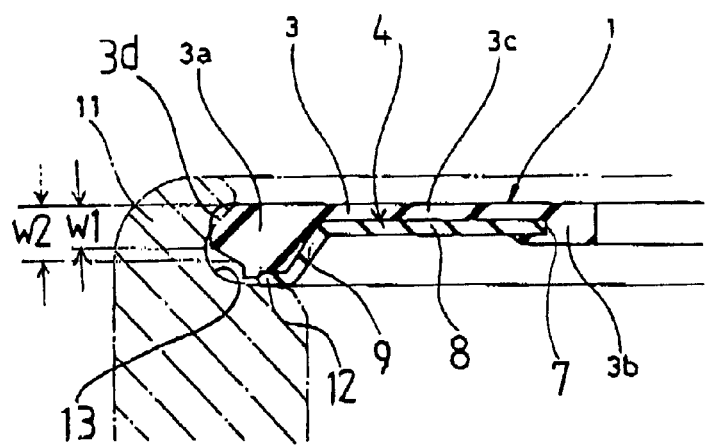
FIG. 1 is a partial cross-sectional side view of the bearing seal that is manufactured by the manufacturing method of the present invention.

FIG. 1 is a partial cross-sectional view showing an outer race made of metal 11 and a sealing device 1, which is fitted into an groove 13 provided in the outer race as is shown in FIG. 10. The inner race and the rolling bearing is not shown in FIG. 1.

Referring to FIG. 1 which represents one of a sealing device according to the present invention, the sealing device 1 has a metal fitting member (or portion) 4 and a elastic elastomer member (or portion) 3. The metal fitting portion 4 is like a ring in shape and has an inner plain ring portion 8, a skirt-like portion 9 extending obliquely and radially outwardly from an outer annular periphery of the inner plain ring portion 8, and an outer ring portion 12 extending radially outwardly from the outer periphery of the skirt-like portion 9. The skirt-like portion may be alternatively like a cylindrical (tubular) shape. The surface of the metal fitting member 4 is usually coated with adhesives to improve adhesion to the elastic elastomer 3. The elastic elastomer 3 covers the metal fitting portion 4 as shown in FIG. 1. The elastic elastomer 3 is like a ring in shape and has an inner peripheral portion 3b and an outer peripheral portion 3a. The inner peripheral portion 3b is fitted into a groove 13 in the inner race (not shown). The outer peripheral portion 3a is fitted into a groove in the outer race 11 as shown in FIG. 1. It is essential for one of sealing devices of the present invention that there is a space in the groove even after the sealing device is fitted into the groove. Due to this conformation, contact area between the groove 13 and the outer peripheral portion 3a can be small. And contact pressure of the curvature portion 3d of the sealing device to the outer race 11 can be higher, since the contact area is small.

The thickness W1 at the outermost portion of the outer peripheral portion 3a in the axis direction of the sealing device is preferably not larger than the thickness W2 of an adjacent inner portion. The sealing device has also a curving portion 3d at the axially uppermost and radially outermost portion. The curving portion 3d can linearly contact with the upperside surface of the groove 13 so that the good sealing ability can be achieved. The contact pressure between the curving portion and the surface of the groove is backed by the skirt-like portion 9 as shown in FIG. 1.

Moreover, contact area between the outer peripheral portion 3a and the groove 13 becomes small because a portion of the outer peripheral portion 3a is cut as shown in FIG. 1. The cross-sectional shape of the outer peripheral portion 3a is not limited to that of FIG. 1, as long as there remains a space in the groove when the outer peripheral portion 3a is inserted into the groove 13.

It is also essential for one of a preferable sealing device in the present invention that the outer ring portion 12 contacts directly with the surface of the groove 13 when the sealing device 4 is fitted into the groove 13. Snugly and exactly positioning of the sealing device, both in the direction of axis and radius, can be easily established at the time of fitting the sealing device 4 on the inner and the outer race 11. This is because the rigid and sliding contact is achieved by direct metal to metal contact at the outer ring portion 12 of the metal fitting portion 4. And rigid metal to metal contact enables the sealing device to get an exact positioning of the sealing device.

Next we will explain about a manufacturing method of various type of the sealing devices.

Figure 2:
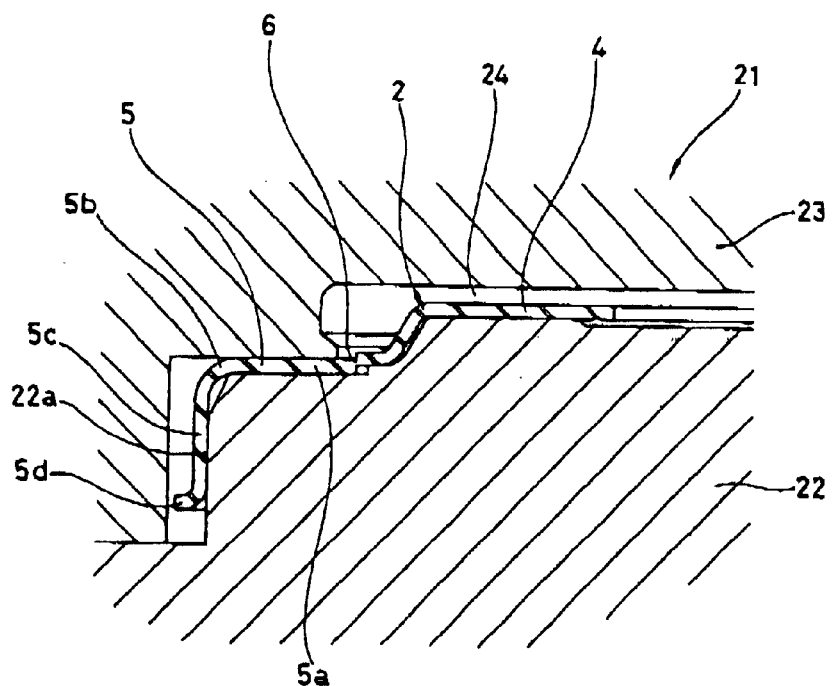
FIG. 2 is an explanatory drawing relating to the process of the manufacturing method of the present invention.

First and Second Embodiment of the Manufacturing Method (FIGS. 2 and 5)

A manufacturing method according to the first and second embodiment is to manufacture the bearing seal 1 of a type of oil seal, as shown in FIG. 1. The bearing seal 1 has a metal fitting 2 press-molded in a ring shape or bull's-eye shape and a ring-shaped or bull's-eye-shaped elastic elastomer 3 that is bake-molded to the metal fitting 2, and in the elastic elastomer 3 of the latter, an outer circumference seal portion 3a that occludes (seals) an inner circumference of an outer lace 11 of the bearing, a lip-shaped inner circumference seal 3b that comes freely into contact with an inner lace (not illustrated in the drawing), and a film-shaped joint part 3c connecting to both sealing parts 3a and 3b.

As shown in FIG. 2, when manufacturing the bearing seal 1 with above-mentioned composition, first the metal component 2 is press-shaped, and in this case, a ring-shaped positioning part or portion (or a disposable portion used for a guide) 5 is provided monolithically on the outer circumference side of the metal fitting portion 4 of this metal component 2, and further a ring-shaped step portion (or half-cutting portion) 6, at which a positioning portion 5 is connected with the metal fitting portion 4, is formed at a joint portion between the metal fitting portion 4 and the positioning portion 5. The metal fitting portion 4, which later will become a portion of a product, has the same cross-sectional shape as that of the metal fitting portion 4 of FIG. 1. The positioning portion 5, which, when mounting the metal component 2 on a lower mould 22 of a vulcanizing mould (or rubber mould or molding mould) 21, is used for positioning the metal component 2 on the lower mould 22, has monolithically a flat portion (flange portion) 5a, a bent portion 5b and a tubular or hollow cylindrical portion 5c. The positioning portion 5 has an approximately cross-sectional L-shaped portion as is shown in FIG. 2. The tubular portion 5c of the positioning portion is fitted on an outer circumference of a cylindrical guide portion 22a provided on the lower mould 22, so that the metal component 2 is placed concentrically and exactly on the lower mould 22. An end portion 5d of the tubular portion 5c is formed in a horn shape somewhat protruding outwardly so as to easily insert this tubular portion 5c to the guide portion 22a.

After inserting the metal component, an upper mould 23 is down to partially contact to the metal component as shown in FIG. 2. Then elastic elastomer is injected into the cavity 24.

The step portion or half-cut portion 6, as shown in enlarged FIG. 3A, is formed in a step shape or half-cut shape between the positioning portion 5 and the metal fitting portion 2 so as to make a later separation process easy. As shown in enlarged FIG. 3B, in stead of the step or half-cut shape a wedge-shaped annular groove 6 may be formed between the positioning portion 5 and the metal fitting portion 2. The half-out or step portion or the wedge-shaped groove 6 may be formed circularly in continuously or discontinuously around the metal fitting portion 4, but preferably continuously As shown in FIG. 4, it is possible to form the positioning portion 5 monolithically on the inner circumference side of the metal fitting portion 4. Numeral number are the same as in FIG. 2. Furthermore, in FIG. 2 and FIG. 4, the guide portion 22a is formed in the lower mould 22 so as to mount the metal component 2 on the lower mould 22. When the metal component 2 is mounted on the upper mould 23. A guide portion may be formed on the upper mould 23. Concerning the structure of the guide, various methods can be available other than the combination of the tubular portion 5c and the guide portion 22a mentioned above. For example, a knock hole may be also available.

As shown in FIG. 2 or FIG. 4, after forming the metal component 2, the metal component 2 is mounted on the vulcanizing mould 21, and then the upper mould 23 is mounted onto the mould 21. And then a molding material (not shown) is injected into a cavity 24 to bake-mold the molding material onto the metal fitting portion 4. The molding material does not flow out through a portion between the upper mould 23 and the metal fitting portion 5, because the upper heated mould 23 and the positioning portion 5 of the metal component 2 come into close contact with each other.

Next, after molding, the moulds are opened and then a bake-molded product having positioning portion 5 is released from the mould. The positioning portion 5 is separated from the metal fitting portion 4 of the metal components 2 at the specific portion (half-cutting, step or wedge-cut portion or the like) 6 using a punching jig 31 as shown in FIG. 5. The positioning portion 5 is separated from the seal 1 by pushing the positioning portion 5 by the punching jig 31 as shown in FIG. 5. A molding flash 3d can be separated from the seal 1 simultaneously. In order to further ease the separation process, the elastic elastomer 3 may better be bake-molded only onto the metal fitting portion 4.

Processing diagram is shown in FIG. 6. Referring to FIG. 6, the seal is made by the following steps comprising:
- forming a metal component having a metal fitting portion and a positioning portion;
- placing the metal component onto a mould and then mounting another mould onto the mould having the metal component;
- preparing a molding material;
- bake-molding the molding material onto the metal fitting portion of the metal component;
- removing the bake-molded vulcanizate from the mould; and
- removing the positioning portion from the metal fitting portion to obtain a sealing device.

According to the above-mentioned manufacturing method as shown in FIGS. 1 to 6, since the metal component 2 is positioned to the heated vulcanizing mould 21 by the positioning portion 5 formed monolithically onto the outer circumference side or inner circumference side of the metal fitting portion 4 of the metal component 2, the supply of the metal component 2 to the vulcanizing mould 21 is made easy even in a small size seal, and thereby productivity can be considerably improved. Since the positioning of the metal component 2 by the positioning portion 5, in the light of the shape of the positioning portion 5, is easy and exact, it is possible to prevent the metal component 2 from displacement from a guide portion 22a of the vulcanizing mould 21 due to a flow pressure of a molding material and a heat expansion of the metal component 2. In addition, since the metal component 2 is formed as a large-sized portion having monolithically the positioning portion 5 and the metal fitting portion 4, it can be possible to carry the metal component 2 onto the predetermined position in the mould by using a robot arm or the like.

Besides, when forming the metal component 2 in which the positioning portion 5 and the metal fitting portion 4 are formed monolithically, since the half-cutting or step portion, wedge-cut portion or the like 6 of the separation portion facilitate the process of separation of the positioning portion 4 from the metal fitting portion 5. The separating process can be carried out exactly and easily, thereby improving the productivity.

Additionally, the manufacturing method of the present invention is not limited to the bearing seal 1 but can be used in manufacturing of various sealing devices such as oil seals, lip seals, gaskets or the like.

The present invention exerts the following effects.

First, according to the manufacturing method of the sealing device of the present invention, since the metal component is positioned onto the vulcanizing mould by the positioning portion that is formed monolithically. The metal component can be fitted onto the vulcanizing mould easily and exactly even in the case of a space saving seal. Thereby defective fraction can largely decrease. Since the positioning of the metal component, is easy and firmly, it is possible to prevent the metal component from displacement of the guide portion in the vulcanizing mould which is caused by a flow pressure of a molding material or a heat expansion of the metal component. In addition, since the metal component is formed as a large-sized portion having monolithically the positioning portion and the metal fitting portion, it is easily possible to carry the metal component onto the mould by using a robot arm or the like.

In addition to the above, when forming the metal component in which the positioning portion and the metal fitting portion are formed monolithically, since the half-cutting or step portion, wedge-cut portion or the like facilitates the separation of the positioning portion from the metal fitting portion. Separating process can be carried out exactly and easily, thereby improving the productivity.

Third and Forth Embodiment of the Manufacturing Method (FIG. 7 to FIG. 10 and FIG. 13)

These two embodiments relate to the manufacturing method for the sealing device having an outermost metal portion all covered by elastomer as shown in FIG. 12.

In these embodiments, a plurality of metal fitting 34 are formed in one metal sheet 33 as shown in FIG. 11. The metal sheet other than the metal fitting 34 which is called in the present invention as a joining portion 39 which joins all metal fitting 34. The number of metal fitting 33 in one metal sheet can be adopted arbitrarily. In the central part of each metal fitting 34, a hole 35 is made. There is a step portion (not shown) which is used a part of the product. These step portion is not necessary for all type of products. An annular half-cutting portion 37, similar to that in FIG. 3A, surrounds the step portion similar to the First and Second embodiment. These metal sheet 33 having a plurality of metal fitting 34 can be made for example by a punching machine. The half-cut portion 37 can be made at the same time of the punching procedure. A plurality of a positioning hole 32 which are placed on guide pins (not shown) formed in a larger mould is also provided in the metal sheet 33. By these positioning holes 32 the metal sheet 33 is placed accurately on a predetermined position of the larger mould. The larger mould has a plurality of each mould which is used for molding each sealing device.

As shown In FIG. 7, which is a partial half view of one of the moulds in the larger mould 30, 31. The metal fitting 34 is placed on the heated lower mould 30. The upper larger mould 31 is heated and placed over the metal fitting 34. At this time the metal fitting 34 is connected with the joining portion 39 by way of the half-cut portion 37. When the elastic elastomer is injected from an injection hole 40, the elastomer runs through a cavity 38 and push the joining portion in a direction as is shown by an arrow in FIG. 7, thereby the joining portion 39 is removed off from the metal fitting 34. This is because there is a half-cutting portion 37 around the metal fitting 34 which is easily cut by for example a relatively small force of about 10 Kg/cm$^2$ or so.

As shown in FIG. 8, the removed metal fitting portion 34 free from the joining portion 39 is engaged with a center pin 43, which is formed on the lower larger mould, with the hole 35, thereby the metal fitting 34 is hold in its exact place. Then the elastomer runs through and around the outermost peripheral portion 41 of the metal fitting 34 to cover all the surface of the periphral portion 41 as shown in FIG. 8. After a predetermined time of vulcanization, the product is removed from the mould. The product is connected by way of a thin burr 49 with the joining portion 39. Then the product is removed from the burr 49 by pushing the product by finger or the like.

Referring to FIGS. 9 and 10 which shows Forth embodiment similar to FIGS. 7 and 8, same metal sheet 33 in FIG. 11 can be used in this embodiment. First the metal sheet 33 having a plurality of the metal fitting 34 is placed on the heated lower larger mould 42 as shown in FIG. 9. The metal sheet is placed on the mould upside down when compared with FIGS. 7 and 8. Then the upper heated larger mould 44 is moved downwardly to contact and push the upper surface of the metal fitting 34 as shown in FIG. 9, Shear force is applied on the half-cut portion 37 to separate the metal fitting 34 from the joining portion 39. The metal fitting 34 is secured exactly in the predetermined location by engaging the hole 35 of the metal fitting 34 with a pin 45 formed on the lower larger mould 42. Then the elastic elastomer is injected through a injection opening 46 and run through a cavity 47. Then the elasomer run through, around and cover all the outermost periphery 41 of the metal fitting 34. The metal fitting 34 and the joining portion 39 is connected by way of thin burr. After a predetermined vulcanization time, vulcanizates (products) were removed from the mould 42,44. The thus obtained products is then separated from the joining portion 39 by cutting the thin burr 49 by pushing the products with fingers or the like as shown in FIG. 13.

As the needs arises, inner peripheral portion of the product can be cut to adjust the size of the hole 35. The steps of the Third and the Forth embodiment of the manufacturing of a sealing device is illustrated in FIG. 13 showing a partial cross-sectional view. The metal fitting 34 having the half-cut portion 37 which connect to the joining portion. The half-cut portion 37 is Cut in the mould by shearing force induced by the mould or by a pushing force induced by elastic elastomer. And then the elastic elastomer 3 run through the cavity (not shown) and bake-molded onto the surface of the metal fitting 34. After bake-molding the products are discharged from the mould. And then the sealing device is removed from the joining portion 39 at the thin burr 49.

According to the Third and Forth embodiment, since separation of the metal fitting from the joining portion is made simultaneously in the mould before injectioning elastic elastomer, the outermost tip of the metal fitting can be covered completely with elastic vulcanizate.

What is claimed is:

1. A method for manufacturing a sealing device having a ring metal fitting portion and an elastic elastomer portion bake-molded to the metal fitting portion, comprising the steps of:

forming a metal component having a fitting portion and a positioning portion extending from the fitting portion for positioning of the fitting portion at a predetermined position in a mould, the metal fitting portion being a reinforcing metal plate in the sealing device;

positioning the fitting portion at the predetermined position in the mold;

molding an elastic elastomer in the mould to obtain a bake-molded elastic elastomer holding the fitting portion monolithically; and thereafter removing said positioning portion from the fitting portion to obtain the sealing device.

2. The method for manufacturing a sealing device according to claim 1, wherein the metal component has a half-cutting portion or a step portion for making separation of the positioning portion from the sealing device.

3. The method for manufacturing a sealing device according to claim 1, wherein the positioning portion has a tubular portion for guiding the metal component sliding on the mould into the predetermined place in the mould.

4. The method for manufacturing a sealing device according to claim 1, wherein the positioning portion has a L-shaped portion in cross section.

5. The method for manufacturing a sealing device according to claim 3, wherein an annular joint portion is located between the tubular portion and a flange portion.

6. The method for manufacturing a sealing device according to claim 1, wherein the positioning portion is connected to at least one of peripheral end portions of the fitting portion.

7. A method for manufacturing a sealing device having a ring metal fitting portion and an elastic elastomer portion bake-molded to the metal fitting portion, a radially outer tip portion of the ring metal fitting portion being completely covered by the elastic elastomer portion, comprising the steps of:

forming a metal sheet having a plurality of the metal fitting portions, a joining portion joining all metal fitting portions, an annular half-cut portion around an outer peripheral portion of the metal fitting portions and a plurality of holes for positioning the metal sheet in a predetermined position of a lower mould;

positioning the metal sheet at the predetermined position in the mould by setting the plurality of holes into a guide pin formed on the lower mould;

closing the lower mould with an upper mould;

molding the elastic elastomer in a cavity of the mould to obtain a bake-molded elastic elastomer portion on the metal fitting portions with the metal fitting portions cutting away from the joining portion by a force caused by a flow of elastic elastomer;

removing the formed sealing device including the metal fitting portion and the bake-molded elastic elastomer portion from the mould; and separating the sealing device from the joining portion by cutting a burr which connects the sealing device and joining portion.

8. A method for manufacturing a sealing device having a ring metal fitting portion and an elastic elastomer bake-molded portion, the a radially outer tip portion of the ring metal fitting portion being completely covered by the elastomer, comprising the steps of:

forming a metal sheet having a plurality of metal fitting portions, a joining portion joining all of the metal fitting portions, an annular half-cut portion around an outer peripheral portion of the metal fitting portions and a plurality of holes for positioning the metal sheet in a predetermined position of a lower mould;

positioning the metal sheet at the predetermined position in the mould by setting the plurality of holes into a guide pin formed on the lower mould;

closing the lower mould with an upper mould with the metal fitting portions and cutting away most of the joining portion by applying shear force on the annular half-cut portion;

molding the elastic elastomer in a cavity of the mould onto the metal fitting portion to obtain the sealing device;

removing the formed sealing device including the metal fitting portion and the bake-molded elastic elastomer portion from the mould; and separating the sealing device from the joining portion by cutting a burr which connects the sealing device and the joining portion.

* * * * *